(12) United States Patent
Hirano et al.

(10) Patent No.: US 6,333,579 B1
(45) Date of Patent: Dec. 25, 2001

(54) STATOR FOR OUTER ROTOR-TYPE MULTI-POLE GENERATOR

(75) Inventors: Hidetoshi Hirano; Masayuki Tozuka, both of Gunma (JP)

(73) Assignee: Sawafuji Electric Co., Ltd., Tokyo (JP)

( * ) Notice: Subject to any disclaimer, the term of this patent is extended or adjusted under 35 U.S.C. 154(b) by 0 days.

(21) Appl. No.: 09/528,987

(22) Filed: Mar. 20, 2000

(30) Foreign Application Priority Data

Mar. 31, 1999 (JP) .................................................. 11-090562

(51) Int. Cl.$^7$ ............................. H02K 1/00; H02K 11/00; H02K 1/12; H02K 1/04
(52) U.S. Cl. ............................ 310/194; 310/71; 310/43; 310/254
(58) Field of Search .............................. 310/194, 71, 43, 310/254, 259, 258, 260

(56) References Cited

U.S. PATENT DOCUMENTS

| | | | |
|---|---|---|---|
| 5,173,628 | * | 12/1992 | Yoshida et al. ........................ 310/71 |
| 5,508,578 | * | 4/1996 | Suzuki et al. ........................ 310/254 |
| 5,519,271 | * | 5/1996 | Sakashita et al. ..................... 310/71 |
| 5,900,687 | * | 5/1999 | Kondo et al. .......................... 310/71 |
| 6,011,339 | * | 1/2000 | Kawakami ............................ 310/208 |
| 6,030,260 | * | 2/2000 | Kikuchi et al. ....................... 439/890 |
| 6,091,172 | * | 7/2000 | Kakinuma et al. .................... 310/71 |
| 6,127,760 | * | 10/2000 | Nagasaki et al. .................... 310/254 |
| 6,137,198 | * | 10/2000 | Kawamura ............................ 310/71 |

FOREIGN PATENT DOCUMENTS 9-93849   4/1997   (JP) .

* cited by examiner

Primary Examiner—Tran Nguyen
Assistant Examiner—Dang Dinh Le
(74) Attorney, Agent, or Firm—Arent Fox Kintner Plotkin & Kahn PLLC

(57) ABSTRACT

In a stator for an outer rotor-type multi-pole generator, in which coils of an identical type but different from a coil wound around a particular one of cylindrical portions integrally included in a bobbin to cover a plurality of salient poles of a stator core, are wound around a pair of the cylindrical portions adjoining and located on opposite sides of the particular cylindrical portion, a recess concaved inwards in a radial direction of a core base is provided in a guide projection at a location corresponding to the particular one of the cylindrical portions, and a crossover wire is disposed in the recess. Thus, the particular cylindrical portion and the crossover wire can be insulated from each other to ensure a stable insulating property, while avoiding an increase in operating steps.

5 Claims, 10 Drawing Sheets

STATOR FOR OUTER ROTOR-TYPE MULTI-POLE GENERATOR

BACKGROUND OF THE INVENTION

1. Field of the Invention

The present invention relates to a stator for an outer rotor-type multi-pole generator, including a stator core, a bobbin covering a most part of the stator core, the stator core and the bobbin being coupled by molding to each other, and coils of an identical type but different from a coil wound around a particular one of a plurality of cylindrical portions integrally provided in the bobbin so as to cover a plurality of salient poles of the stator core, the coils of the identical type being wound around a pair of the cylindrical portions adjoining and located on opposite sides of the particular cylindrical portion, the coils of the identical type being connected to each other through a crossover wire. Particularly, the present invention relates to an improvement in a structure of insulating the coil wound around the particular cylindrical portion and the crossover wire from each other.

2. Description of the Related Art

A stator for an outer rotor-type multi-pole generator having coils wound around a plurality of cylindrical portions integrally included in a bobbin so as to cover a plurality of salient poles included in a stator core is already known from Japanese Patent Application Laid-open No.9-93849 and the like. In such a stator, coils of the identical type but different from the coil wound around a particular one of the cylindrical portions may be wound around a pair of the cylindrical portions adjoining and located on the opposite sides of the particular cylindrical portion. In this case, if the pair of coils of the identical type are connected to each other outside the stator, it is necessary to connect two of four output wires extending from the coils of the identical type at a subsequent step, or it is necessary to ensure a space for disposition of a terminal for every output wire in the stator. For this reason, in order to ensure that a labor for connecting the wires at the subsequent step can be eliminated and moreover, the space required for the disposition of the terminal can be reduced, it is a conventional practice that a single continuous lead wire is wound around both of the cylindrical portions of the bobbin to form a pair of coils of the identical type, and that portion of the lead wire, which connects the coils of the identical type to each other, is disposed as a crossover wire along a portion of an outer periphery of a guide projection included in the bobbin. However, the conventional guide projection is formed into a cylindrical shape at a location near base ends of the cylindrical portions and hence, the crossover wire is disposed in a portion corresponding to the particular cylindrical portion in proximity to the base end of the particular cylindrical portion, whereby there is a possibility that the crossover wire may be brought into contact with the coil wound around the particular cylindrical portion to produce a short circuit. For this reason, in the prior art, an insulating tape is wound by an operator around at least that portion of the coil wound around the particular cylindrical portion, which is located on the side of the crossover wire.

The winding of the insulating tape by the operator as in the prior art may result in a variability in insulating property, and may bring about an increase in operating steps.

SUMMARY OF THE INVENTION

Accordingly, it is an object of the present invention to provide a stator for an outer rotor-type multi-pole generator, wherein the wire wound around the particular cylindrical portion and the crossover wire can be insulated from each other to ensure a stable insulating property, while avoiding an increase in operating steps.

To achieve the above object, according to a first aspect and feature of the present invention, there is provided a stator for an outer rotor-type multi-pole generator, comprising a stator core including a plurality of salient poles projectingly mounted at equal distances from one another on an outer periphery of a core base formed into a ring shape, and a bobbin made of a synthetic resin, wherein the bobbin is integrally provided with a main bobbin portion covering at least the outer periphery of the core base, a plurality of cylindrical portions protruding from the main bobbin portion so as to cover the salient poles excluding tip ends of the salient poles, and a guide projection which protrudes in a cylindrical shape from one end surface of the main bobbin portion, the stator core and the bobbin being coupled by molding to each other, and coils of an identical type but different from a coil wound around a particular one of the cylindrical portions are wound around a pair of the cylindrical portions adjoining and located on opposite sides of the particular one of the cylindrical portions, a crossover wire connecting the coils of the identical type being disposed along a portion of an outer periphery of the guide projection, and wherein the guide projection has a recess which is provided therein at a location corresponding to the particular one of the cylindrical portions integrally included in the bobbin, the recess being concaved inwards in a radial direction of the core base, the crossover wire being disposed in the recess.

With the arrangement of the above first feature, the crossover wire can be disposed in a portion corresponding to the particular cylindrical portion at a location relatively spaced apart from a base end of the particular cylindrical portion. Moreover, the guide projection having the recess is formed without any variability upon molding of the bobbin, and it is unnecessary for an operator to wind an insulating tape for the purpose of ensuring an insulating property. Therefore, the particular cylindrical portion and the crossover wire can be insulated from each other to ensure a stable insulating property, while avoiding an increase in operating steps.

To achieve the above object, according to a second aspect and feature of the present invention, there is provided a stator for an outer rotor-type multi-pole generator, comprising a stator core including a plurality of salient poles projectingly mounted at equal distances from one another on an outer periphery of a core base formed into a ring shape, and a bobbin made of a synthetic resin, wherein the bobbin is integrally provided with a main bobbin portion covering at least the outer periphery of the core base, a plurality of cylindrical portions protruding from the main bobbin portion so as to cover the salient poles excluding their tip ends, and a guide projection which protrudes in a cylindrical shape from one end surface of the main bobbin portion, the stator core and the bobbin being coupled by molding to each other, and coils of an identical type but different from a coil wound around particular one of the cylindrical portions, the coils of the identical type being wound around a pair of the cylindrical portions adjoining and located on opposite sides of the particular one of the cylindrical portions, respectively, a crossover wire connecting the coils of the identical type being disposed along a portion of an outer periphery of the guide projection, and wherein the particular one of the cylindrical portions integrally included in the bobbin is integrally provided at a base end thereof with a collar which protrudes outwards from an outer periphery of the coil wound around the particular one of the cylindrical portions, the crossover wire being disposed between the collar and the guide projection.

With the arrangement of th above second feature, the collar is disposed between the coil wound around the particular cylindrical portion and the crossover wire, and the collar protrudes outwards from the outer periphery of the coil wound around the particular cylindrical portion. Therefore, even if the guide projection is disposed at a location near the base ends of the cylindrical portions, the contact of the coil wound around the particular cylindrical portion with the crossover wire can be avoided. Moreover, the collar is formed without any variability upon molding of the bobbin, and it is unnecessary for an operator to wind an insulating tape. Therefore, the particular cylindrical portion and the crossover wire can be insulated from each other to ensure a stable insulating property, while avoiding an increase in operating steps.

According to a third aspect and feature of the present invention, in addition to the second feature, the collar has a pair of grooves provided therein, and lead wires, which extend from opposite ends of the coil wound around the particular cylindrical portion and which are connected to an external lead wire terminal and an earth terminal, are inserted through the grooves. With such arrangement, the lead wires can be supported stably between the coil and the external lead wire terminals as well as the earth terminal.

The above and other objects, features and advantages of the invention will become apparent from the following description of the preferred embodiments taken in conjunction with the accompanying drawings.

BRIEF DESCRIPTION OF THE DRAWINGS

FIGS. 1 to 7 show a first embodiment of the present invention, wherein

FIG. 1 is a vertical sectional view of an outer rotortype multi-pole generator, taken along a line 1—1 in FIG. 2;

FIG. 2 is a front view of stator, taken in the direction of an arrow 2—2 in FIG. 1;

FIG. 3 is a back view of the stator, taken in the direction of an arrow 3—3 in FIG. 1;

FIG. 4 is similar to FIG. 3, but showing a state in which a terminal holder has been removed;

FIG. 5 is an enlarged sectional view taken along a line 5—5 in FIG. 3;

FIG. 6 is a diagram of a coil-connection circuit; and

FIG. 7 is a sectional view taken along a line 7—7 in FIG. 5;

FIGS. 8 to 10 show a second embodiment of the present invention; wherein

FIG. 8 is similar to FIG. 2, but showing a stator according to the second embodiment;

FIG. 9 is a back view similar to FIG. 4, but showing the stator according to the second embodiment; and FIG. 10 is an enlarged view of a portion indicated by an arrow 10.

DESCRIPTION OF THE PREFERRED EMBODIMENTS

Figure 1:
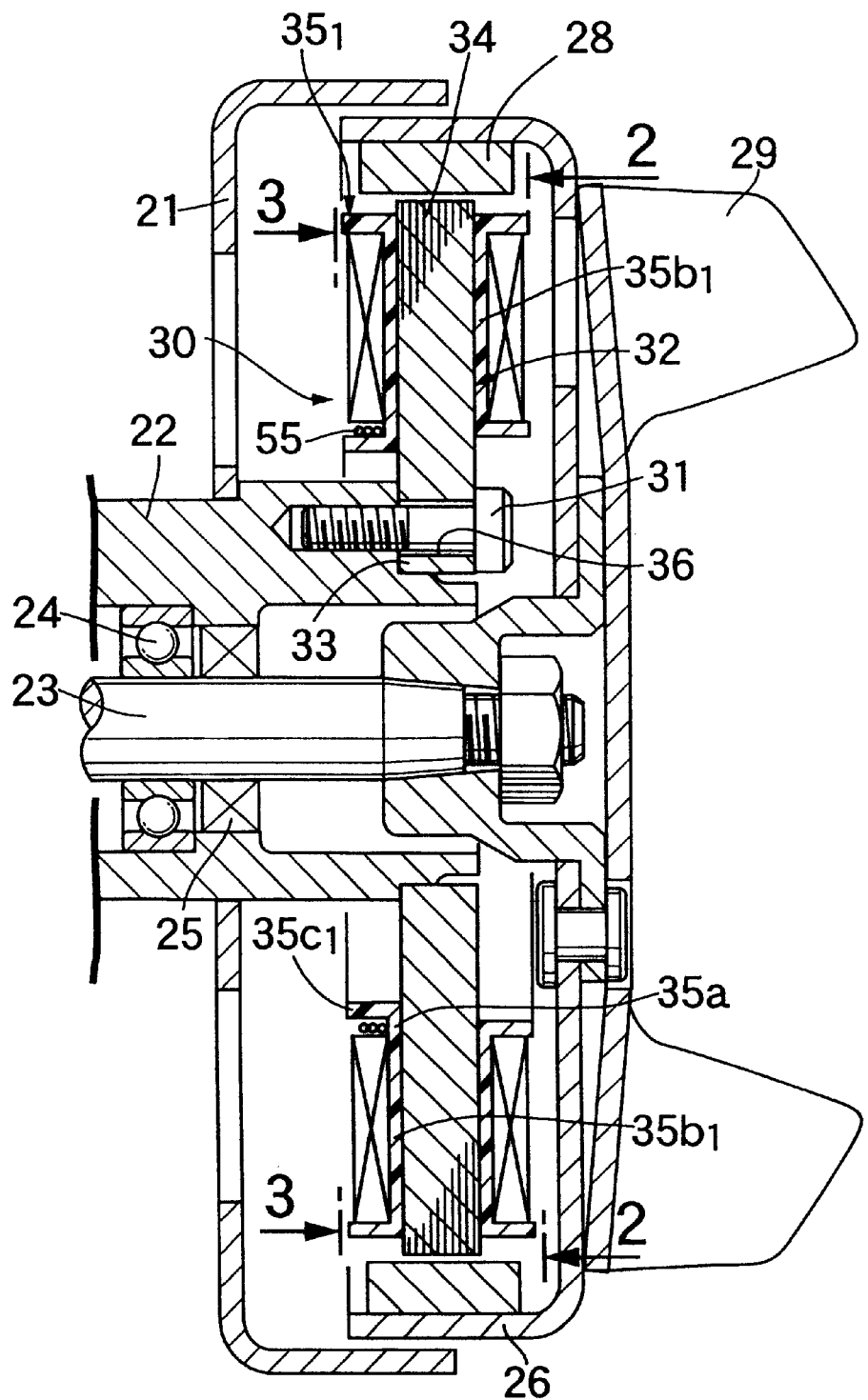
Figure 2:
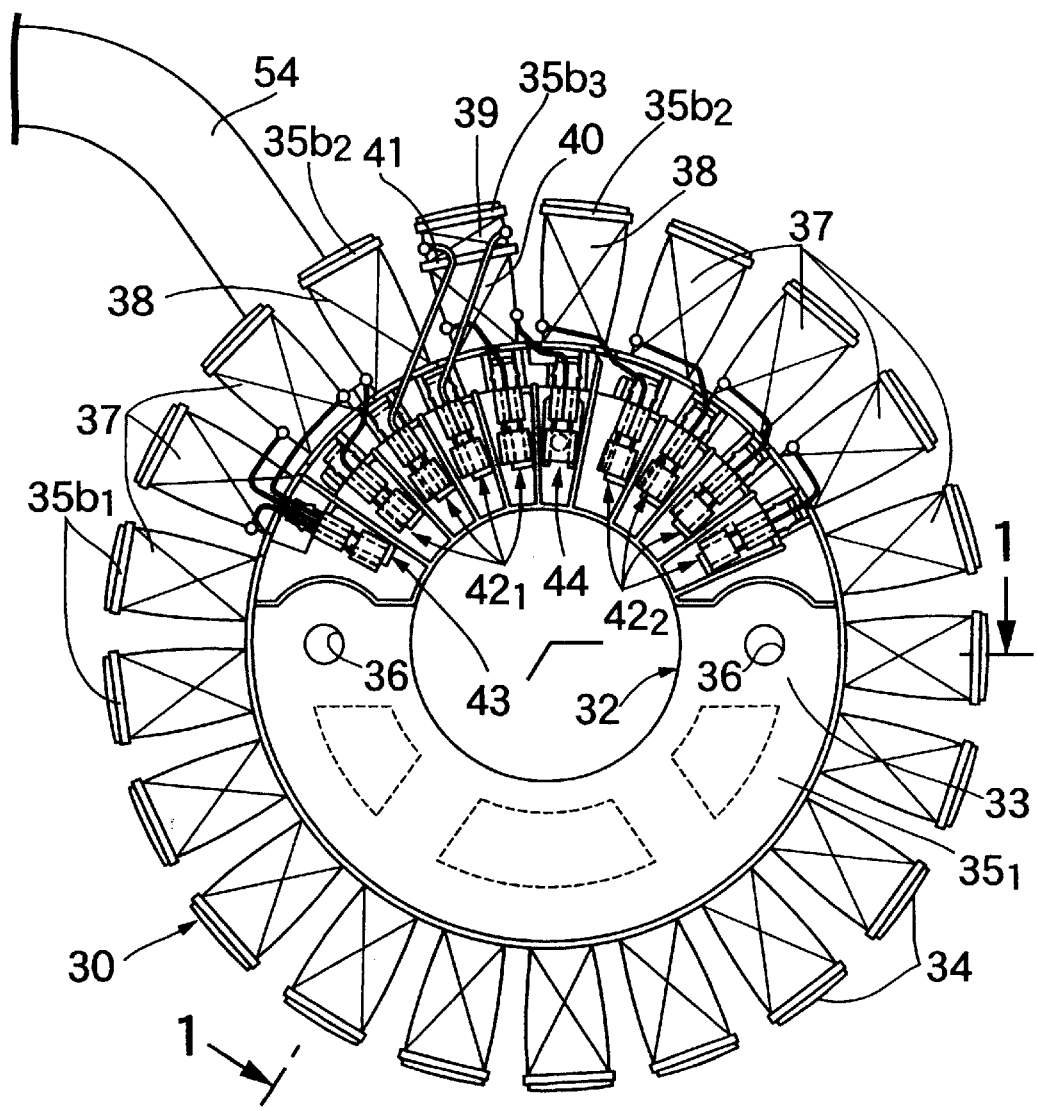

A first embodiment of the present invention will now be described with reference to FIGS. 1 to 7. Referring first to FIG. 1, a sleeve 22 is fixed to a casing 21 of an outer rotor-type multi-pole generator and partially protrudes into the casing 21. A crankshaft 23 of an engine which is not shown is coaxially disposed within the sleeve 22 with a bearing 24 and an oil seal 25 interposed therebetween. A bowl-shaped rotor yoke 26 is coaxially fastened to an end of the crankshaft 23. A magnet 28 is secured to an inner periphery of the rotor yoke 26, and a cooling fan 29 is secured to the rotor yoke 26.

A stator 30 is fixed to an end of the sleeve 22 by a pair of bolts 31, and the magnet 28 mounted on the rotor yoke 26 coaxially surrounds the stator 30 to define a small air gap between the magnet 28 and the stator 30.

Referring also to FIGS. 2 to 5, the stator 30 includes a stator core 32 which is formed from a plurality of core plates laminated one on another. The stator core 32 comprises a plurality of, e.g., twenty one substantially T-shaped salient poles 34 mounted at equal distances spaced apart from one another around an outer periphery of a core base 33 formed into a ring shape.

The stator core 32 is coupled by molding to a bobbin $35_1$ made of a synthetic resin. The bobbin $35_1$ is integrally provided with a main bobbin portion 35a covering at least an outer peripheral portion of the core base 33, a plurality of cylindrical portions $35b_1$ - - - , $35b_2$, $35b_2$, $35b_3$ which protrude from the main bobbin portion 35a to cover the salient poles 34 of the stator core 32, excluding their tip ends, and a guide projection $35c_1$ protruding in a cylindrical shape from one end of the main bobbin portion 35a which is opposed to the casing 21.

Insertion bores 36, 36 are provided at two circumferentially spaced-apart points in the core base 33, and the bolts 31 are inserted through the insertion bores 36, 36 to fasten the stator 30 to the sleeve 22.

Main coils 37 are wound around eighteen of the cylindrical portions $35b_1$ - - - , $35b_2$, $35b_2$, $35b_3$ of the bobbin $35_1$ corresponding to the twenty one salient poles 34, DC coils 38 of the identical type are wound around the cylindrical portions $35b_2$, $35b_2$ corresponding to two other salient poles 34. A sub-coil 39 and an exciter coil 40 are wound around the particular cylindrical portion $35_3$ corresponding to the remaining salient pole 34. The particular cylindrical portion $35_3$ is disposed between the cylindrical portions $35b_2$, $35b_2$ having the DC coils 38, 38 wound therearound. The sub-coil 39 is wound around a tip end of the particular cylindrical portion $35b_3$, while the exciter coil 40 is wound around a base end of the particular cylindrical portion $35b_3$. A partition plate portion 41 is integrally formed on the particular cylindrical portion $35b_3$ for partitioning the sub-coil 39 and the exciter coil 40 from each other.

Figure 6:
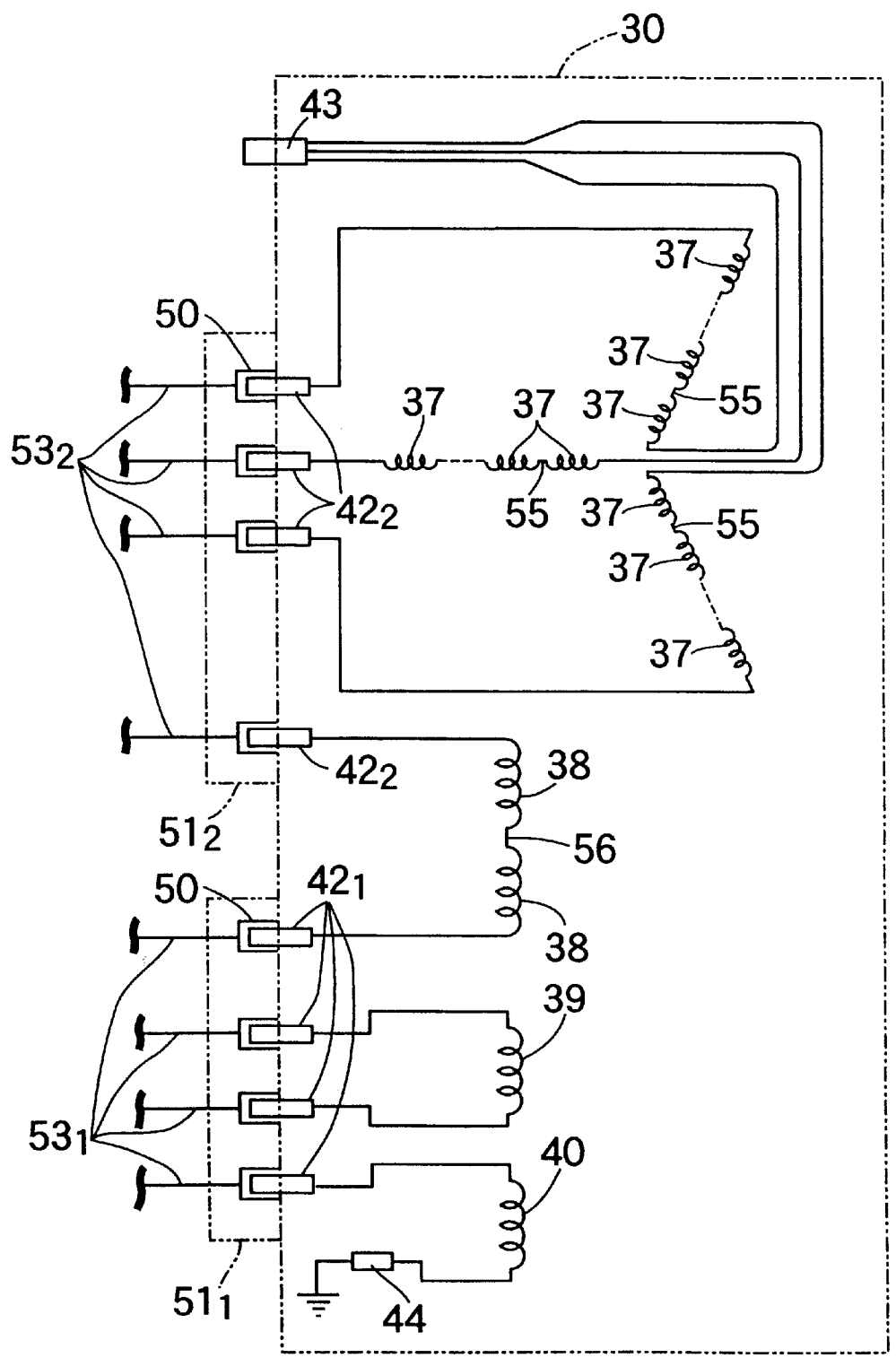

Referring to FIG. 6, one end of each of the six U-phase main coils 37 connected in series, one end of each of the six V-phase main coils 37 connected in series, one end of each of the six W-phase main coils 37 connected in series and one end of each of the pair of DC coils 38, 38 connected in series are connected to terminals $42_2$ for external lead wires, respectively. The other ends of the U-phase, V-phase and W-phase main coils 37 are commonly connected as neutral points to a terminal 43. The other ends of the DC coils 38, 38, opposite ends of the sub-coil 39 and one end of the exciter coil 40 are connected to terminals $42_1$ for external lead wires, respectively, and the other end of the exciter coil 40 is connected to an earth terminal 44.

Figure 7:
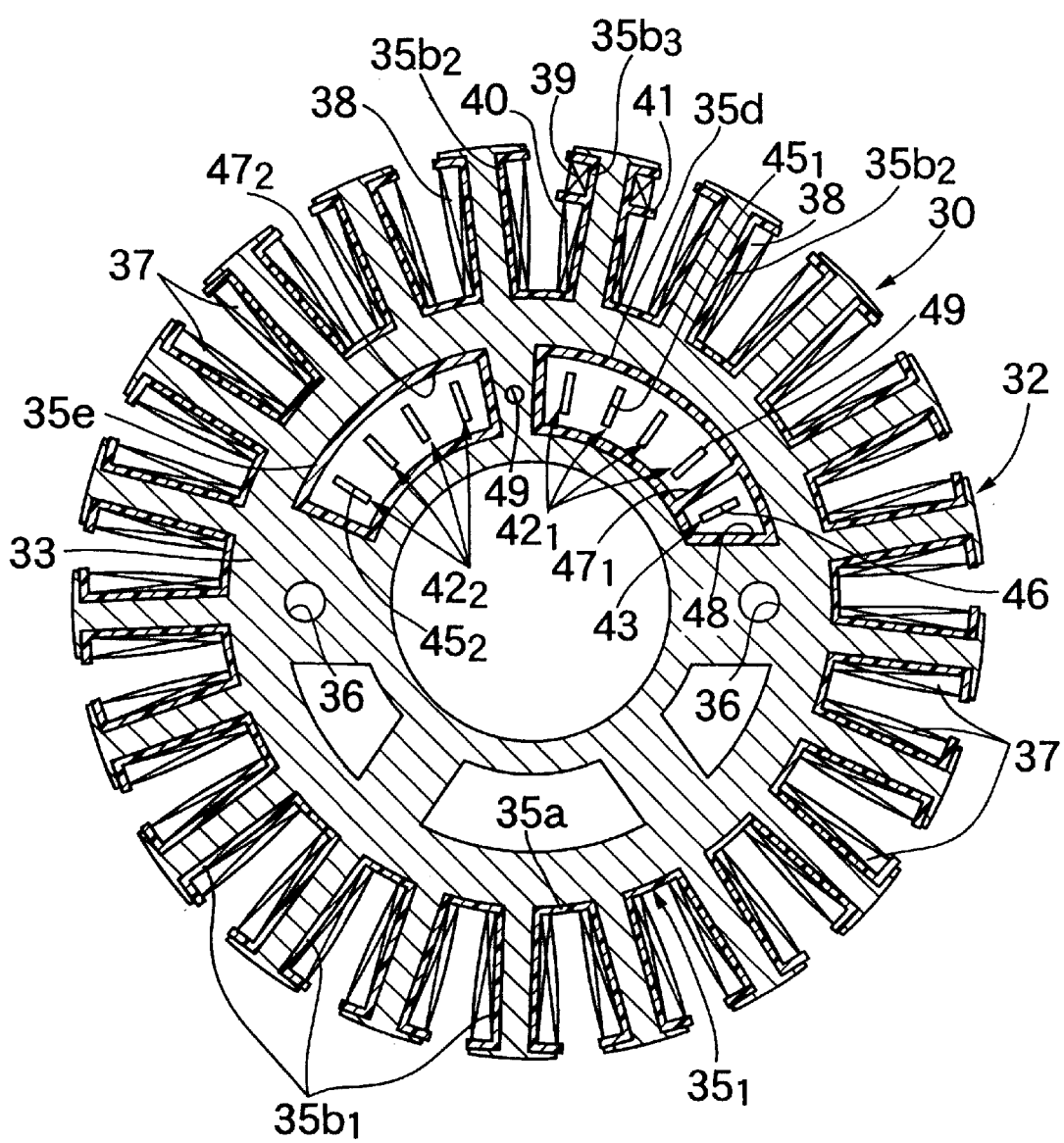

Referring to FIG. 7, a pair of through-portions 35d and 35e are integrally formed in an arcuate shape about an axis of the stator 30 in the main bobbin portion 35a of the bobbin $35_1$ to extend through the core base 33 of the stator core 32 over opposite ends thereof.

Provided in one of the through-portions 35d are four fitting bores $45_1$ individually corresponding to the four terminals $42_1$ for the external lead wires, a single fitting bore 46 corresponding to the terminal 43, a fitting recess $47_1$ faced commonly by the four fitting bores $45_1$, and a recess 48 faced by the fitting bore 46.

The fitting recess $47_1$ is provided in one end surface of the through-portion 35d opposed to the casing 21, and is formed into an arcuate shape. The fitting bores $45_1$ are disposed at a plurality of points spaced apart from one another in a circumferential direction of the bobbin $35_1$, and each have a rectangular cross-sectional shape longer in a radial direction of the bobbin 35. One end of each of the fitting bores $45_1$ opens commonly into the fitting recess $47_1$, and the other ends of the fitting bores $45_1$ open into the other end surface of the main bobbin portion 35a opposed to the rotor yoke 26.

The recess 48 is provided adjacent to the fitting recess $47_1$ in that one end surface of the through-portion 35d of the main bobbin portion 35a, which is opposed to the casing 21. The fitting bore 46 is defined at a location spaced at the same distance apart from the center of the bobbin $35_1$ as the fitting bores $45_1$ so as to have a rectangular cross-sectional shape longer in the radial direction of the bobbin $35_1$, and is provided in the through-portion 35d in such manner that one end thereof opens into the recess 48, and the other end thereof opens into the other end surface of the main bobbin portion 35a which is opposed to the rotor yoke 26.

Provided in the other through-portion 35e are four fitting bores $45_2$ individually corresponding to four terminals $42_2$ for external lead wires, and a fitting recess $47_2$ faced commonly by the fitting bores $45_2$.

The fitting recess $47_2$ is provided in one end of the through-portion 35e opposed to the casing 21, and is formed into an arcuate shape. The fitting bores $45_2$ are disposed at a plurality of points spaced at distances from one another in the circumferential direction of the bobbin $35_1$, and each has a rectangular cross-sectional shape longer in the radial direction of the bobbin $35_1$. One end of each of the fitting bores $45_2$ opens commonly into the recess 54, and the other ends of the fitting bores $45_2$ open into the other end face of the main bobbin portion 35a which is opposed to the rotor yoke 26.

A press-fit bore 49 of a circular cross-sectional shape is provided in the core base 33 of the stator core 32 between both of the through-portions 35d and 35e to extend over the axially opposite ends of the core base 33.

The external lead wire terminals $42_2$ connected to one end of each of the main coils 37 and one end of each of the pair of DC coils 38, 38 are fitted into the fitting bores $45_2$ from the side of the bobbin $35_1$ adjacent the casing 21, respectively, and tip ends of the external lead wire terminals $42_2$ protrude into the fitting recess $47_2$. The external lead wire terminals $42_1$ connected to the other ends of the pair of DC coils 38, 38, the opposite ends of the sub-coil 39 and one end of the exciter coil 40 are fitted into the fitting bores $45_1$ from the side of the bobbin $35_1$ adjacent casing 21, respectively, and tip ends of the external lead wire terminals $42_1$ protrude into the fitting recess $47_1$. Further, the terminal 43, to which the other ends of the main coils 37 are connected commonly, is fitted into the fitting bore 46 from the side of the bobbin $35_1$ adjacent the casing 21, and the earth terminal 44, to which the other end of the exciter coil 40 is connected, is press-fitted into the press-fit bore 49 from the side of the bobbin $35_1$ adjacent the casing 21.

Referring again to FIG. 6, external lead wires $53_2$ are individually connected to the external lead wire terminals $42_2$, and external lead wires $53_1$ are individually connected to the external lead wire terminals $42_1$.

Female terminals 50 are mounted at ends of the external lead wires $53_1$ and $53_2$. Female terminals 50 of the external lead wires $53_1$ are commonly retained in a terminal holder $51_1$ made of a synthetic resin, and female terminals 50 of the external lead wires $53_2$ are commonly retained in a terminal holder $51_2$ made of a synthetic resin.

The terminal holders $51_1$ and $51_2$ are removably fitted in the fitting recesses $47_1$ and $47_2$ defined in the end face of the bobbin $35_1$ in the stator 30 adjacent the casing 21. Tip ends of the external lead wire terminals $42_1$ and $42_2$ protruding into the fitting recesses $47_1$ and $47_2$ are fitted into the female terminals 50 retained in the terminal holders $51_1$ and $51_2$, whereby the external lead wires $53_1$ are connected to the external lead wire terminals $42_1$, respectively, and the external lead wires $53_2$ are connected to the external lead wire terminals $42_2$, respectively.

Figure 3:
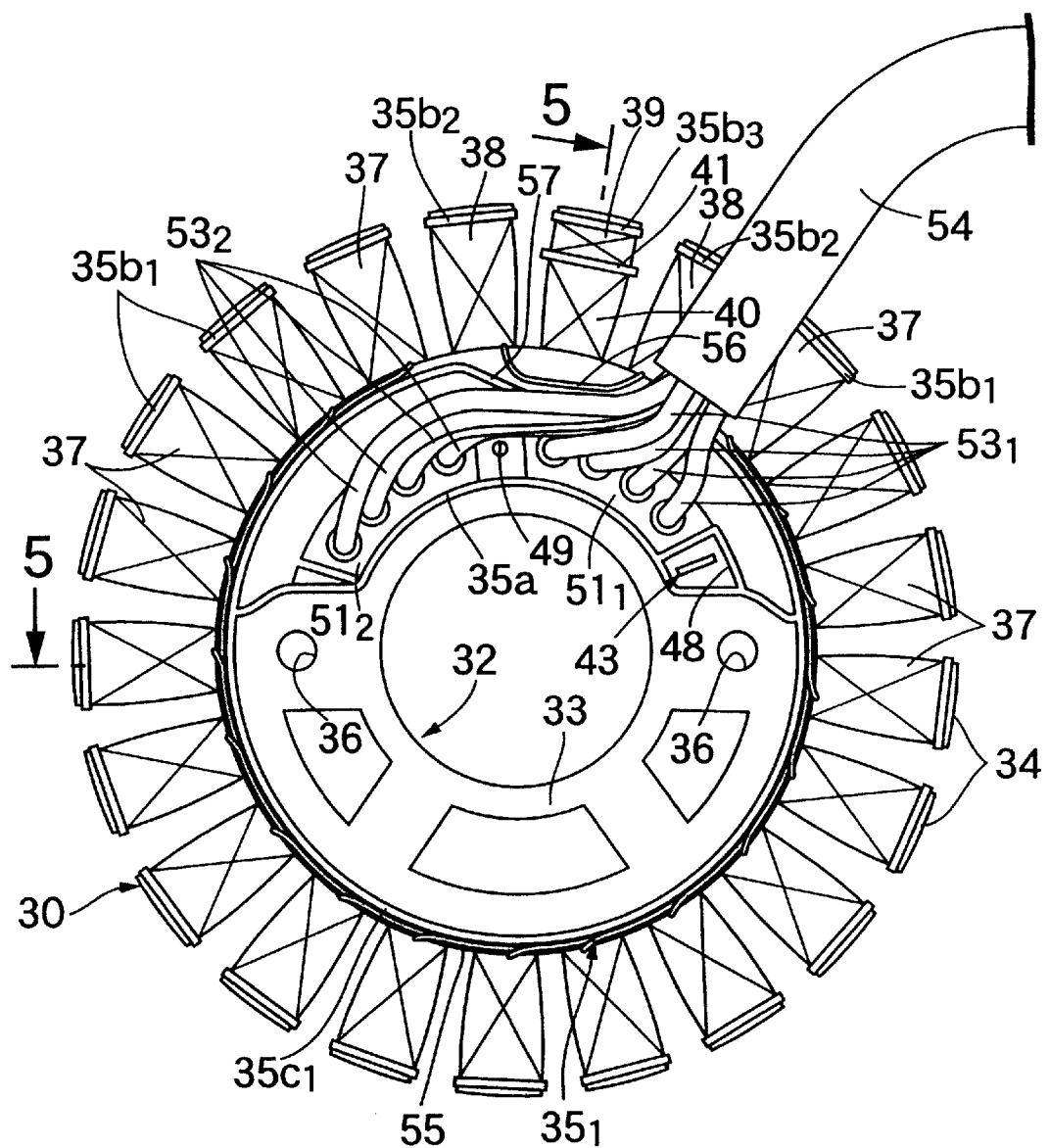
Figure 4:
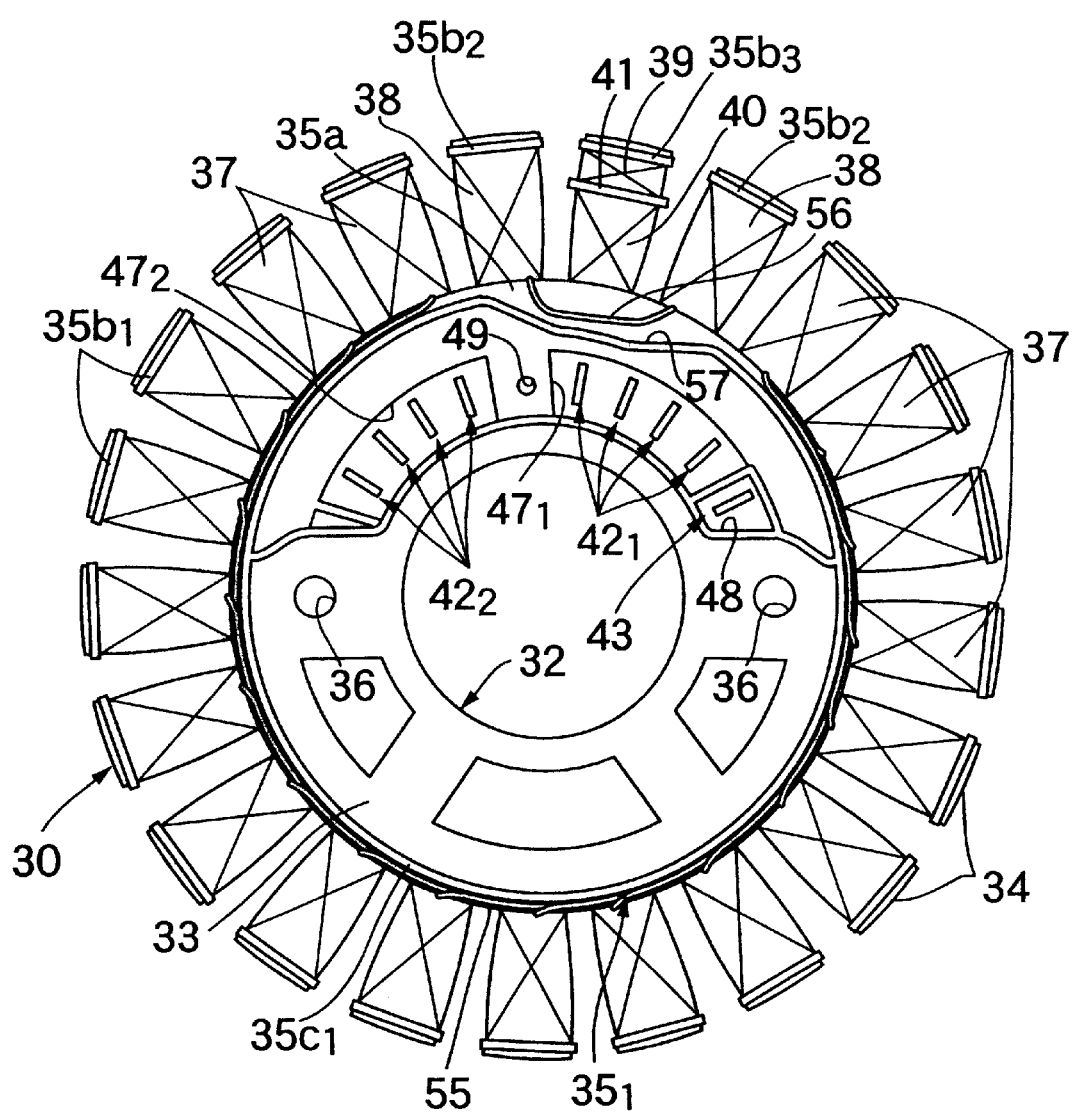
Figure 5:
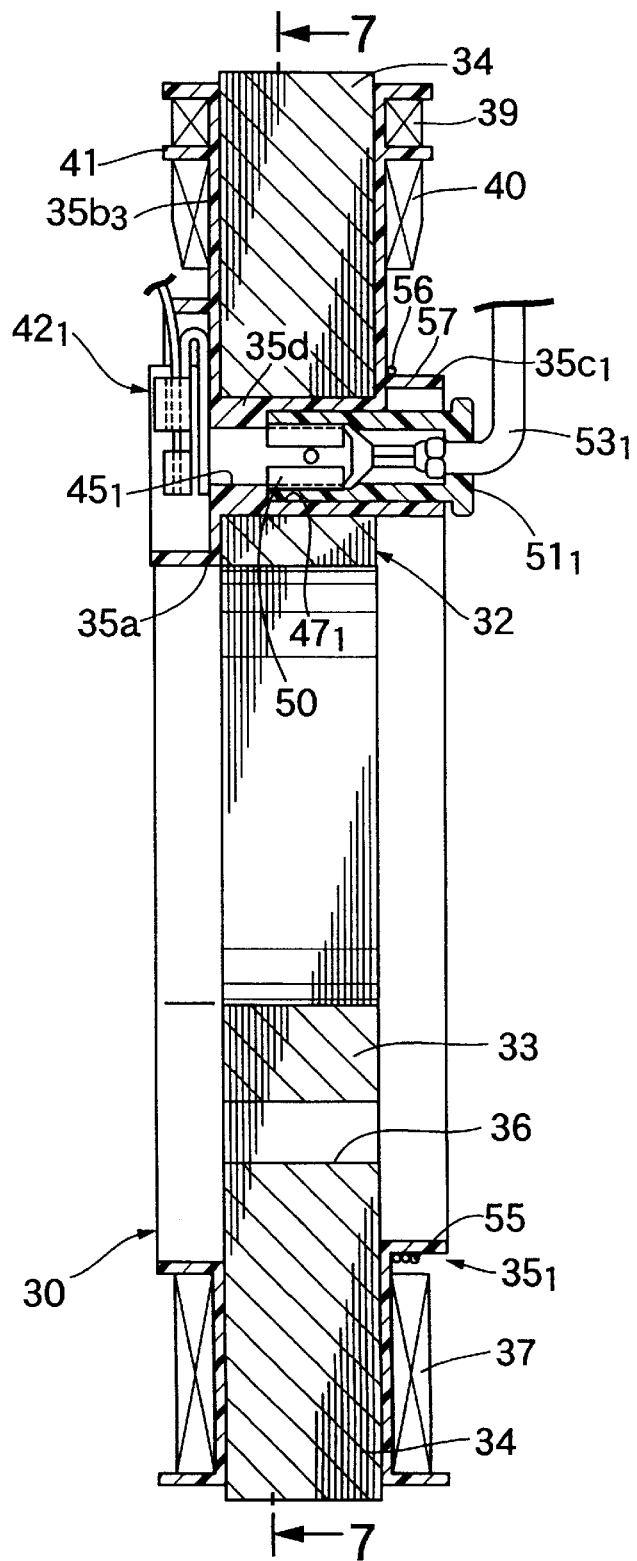

The four external lead wires $53_1$ drawn out of the terminal holder $51_1$ and the four external lead wires $53_2$ drawn out of the terminal holder $51_2$ are inserted into a common tube 54 made of a synthetic resin and bundled, as shown in FIG. 3, and drawn out of the casing 21 (see FIG. 1) to the outside.

The six U-phase main coils 37, the six V-phase main coils 37 and the six W-phase main coils 37 are constructed by winding a single continuous lead wire around the cylindrical portions $35b_1$ of the bobbin $35_1$. Those portions of the lead wires which interconnect the main coils 37 are disposed as crossover wires 55 along a portion of the outer periphery of the guide projection $35c_1$ included in the bobbin $35_1$. The pair of DC coils 38 are also constructed by winding a single continuous lead wire around the cylindrical portions $35b_2$ of the bobbin $35_1$, and that portion of such lead wire which connects both of the DC coils 38 to each other is disposed as a crossover wire 56 along a portion of the outer periphery of the guide projection $35c_1$. Moreover, the cylindrical portions $35b_2$ having the DC coils 38 wound therearound are disposed on opposite sides of the particular cylindrical portion $35b_3$ around which the exciter coil 40 different from the DC coil 38 is wound. Supposing that the guide projection $35c_1$ is formed into a cylindrical shape, the crossover wire 55 is disposed in proximity to the exciter coil 40, and there is a possibility that the crossover wire 56 is brought into contact with the exciter coil 40 to produce a short circuit.

Therefore, according to the present invention, a recess 57 concave inwards in a radial direction of the stator 30 is provided in the guide projection $35c_1$ at a location corresponding to the particular cylindrical portion $35b_3$, i.e., at a location corresponding to the exciter coil 40, and the crossover wire 56 is disposed in the recess 57.

The operation of the first embodiment will be described below. The cross-over wire 56 interconnecting the pair of DC coils 38 disposed on the opposite sides of the exciter coil 40 wound around particular one $35b_3$ of the cylindrical portions $35b_1$, $35b_2$, $35b_2$ and $35b_3$ included in the bobbin $35c_1$ is disposed in the recess 57 provided in the guide projection $35c_1$ in such a manner that it is recessed inwards in the radial direction of the stator 30 at a location corresponding to the particular cylindrical portion $35b_3$. Therefore, the crossover wire 56 can be disposed in a portion corresponding to the particular cylindrical portion $35b_3$ at a location relatively spaced inwards apart from the base end of the particular cylindrical portion $35b_3$, and hence, it is possible to eliminate the possibility that the crossover wire 56 is brought into contact with the exciter coil 40 to produce the short circuit.

Moreover, the guide projection $35c_1$ having the recess 57 is formed without any variability upon molding of the bobbin $35_1$, and it is unnecessary for an operator to wind an insulating tape for the purpose of ensuring an insulating property. Therefore, the exciter coil 40 and the crossover wire 56 can be insulated from each other to ensure a stable insulating property, while avoiding an increase in operating steps.

Figure 8:
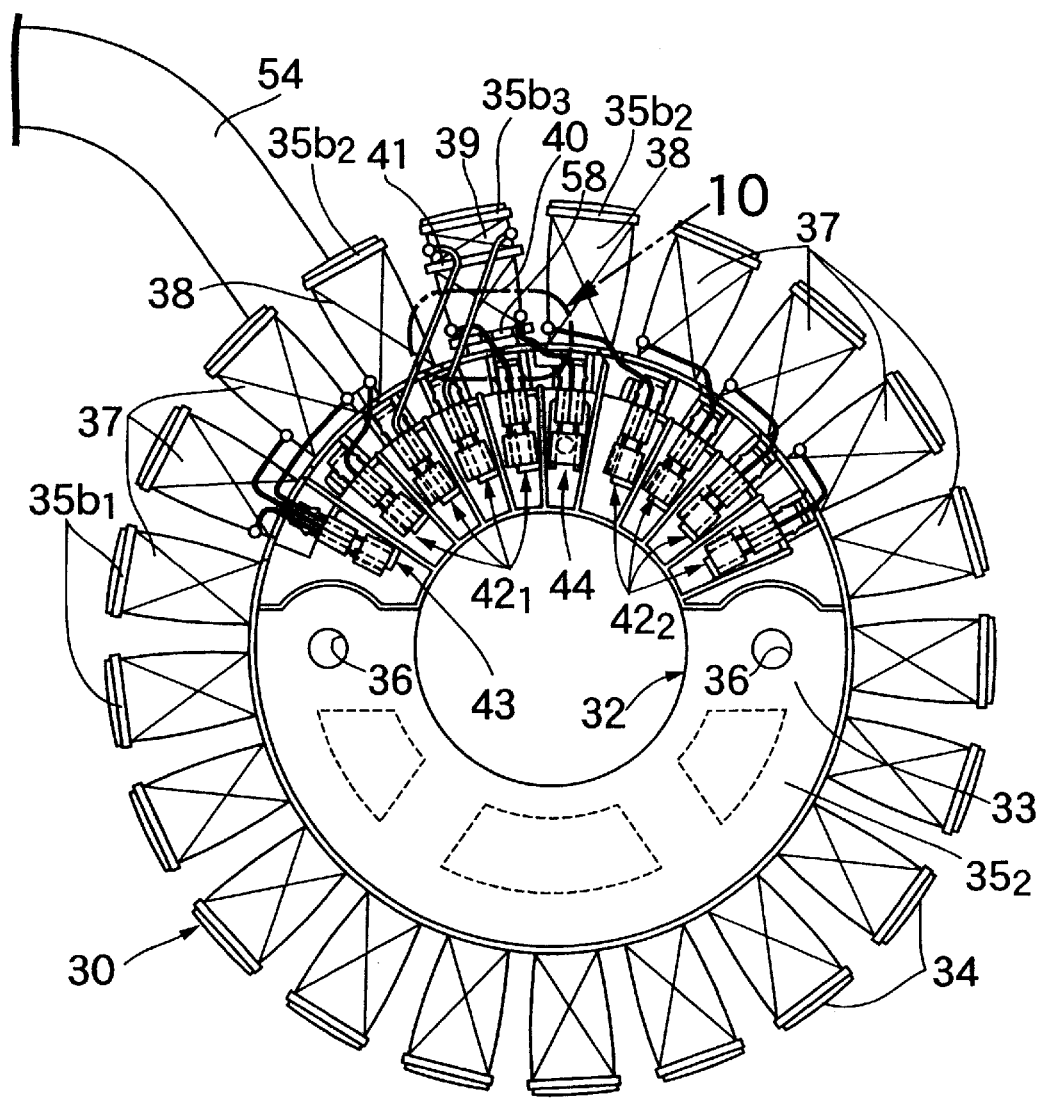
Figure 9:
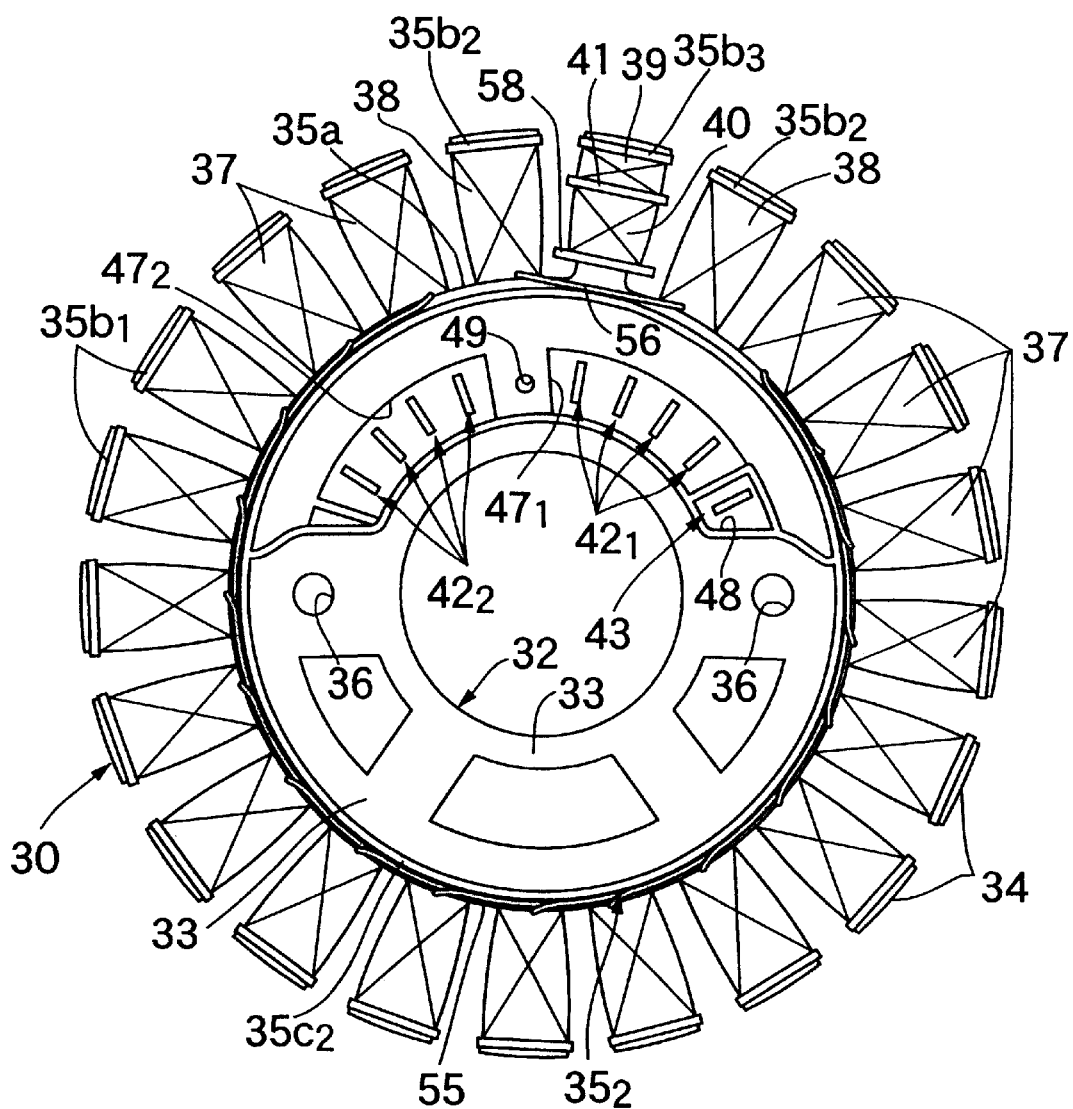
Figure 10:
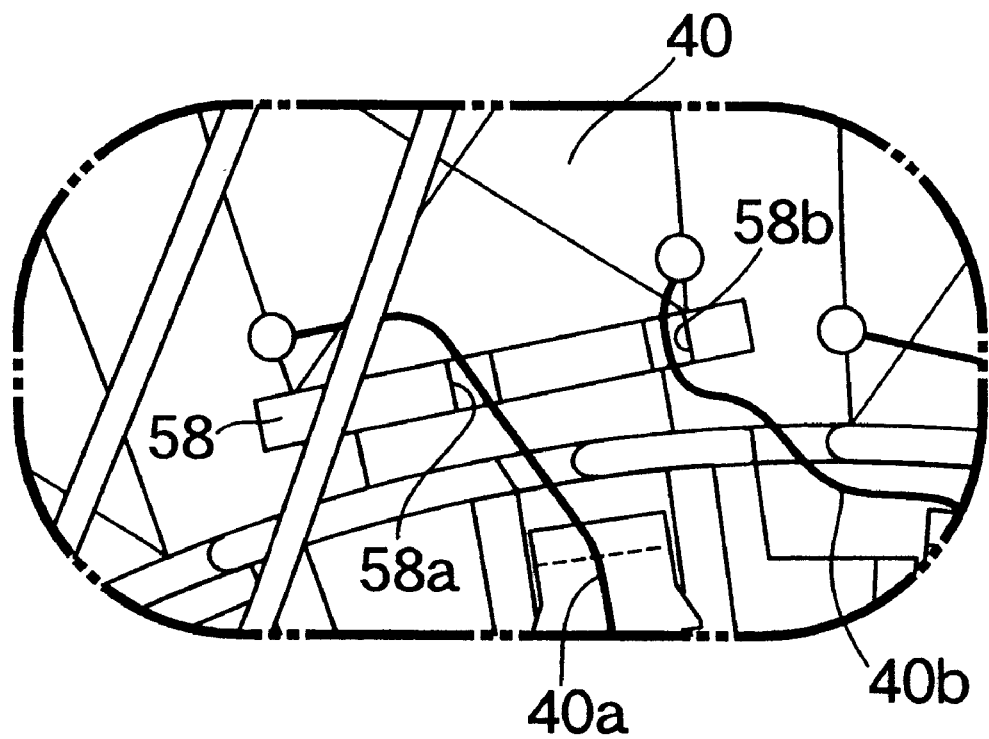

FIGS. 8 to 10 show a second embodiment of the present invention, wherein portions corresponding to those in the first embodiment are designated by like reference characters.

A bobbin $35_2$ made of a synthetic resin is integrally provided with a main bobbin portion 35a which covers at least an outer periphery of a core base 33 of a stator core 32, a plurality of cylindrical portions $35b_1$, $35b_2$, $35b_2$ and $35b_3$ which protrude from the main bobbin portion 35a to cover the salient poles 34 of the stator core 32 excluding their tip ends, and a guide projection $35c_2$ which protrudes in a cylindrical shape from one end surface of the main bobbin portion 35a.

DC coils 38, 38 of the identical type but different from an exciter coil 40 wound around particular one of the cylindrical portions $35b_1$, $35b_2$, $35b_2$ and $35b_3$ included in the bobbin $35_2$ are wound around a pair of the cylindrical portions $35_2$ and $35_2$ adjoining each other on opposite sides of the particular cylindrical portion $35b_3$. A crossover wire 56 connecting the DC coils 38, 38 to each other is disposed along a portion of an outer periphery of the guide projection $35c_2$.

Moreover, according to the present invention, the particular cylindrical portion $35b_3$ is integrally provided at its base end with a collar 58 which protrudes outwards from an outer periphery of the exciter coil 40 wound around the particular cylindrical portion $35b_3$, and the crossover wire 56 is disposed between the collar 58 and the guide projection $35c_2$. As clearly shown in FIG. 10, the collar 58 has a pair of grooves 58a and 58b provided therein, through which lead wires 40a and 40b extending from opposite sides of the exciter coil 40 and connected respectively to an external lead wire terminal $42_1$ and an earth terminal 44 are inserted. As a result of insertion of the lead wires 40a and 40b through the grooves 58a and 58b, the lead wires 40a and 40b are supported stably between the exciter coil 40 and the external lead wire terminal $42_1$ as well as the earth terminal 44.

According to the second embodiment, the collar 58 is disposed between the exciter coil 40 and the crossover wire 56 and protrudes outwards from the outer periphery of the exciter coil 40. Therefore, even if the guide projection $35c_2$ is disposed at a location near base ends of the cylindrical portions $35b_1$, $35b_2$, $35b_2$ and $35b_3$, the contact of the crossover wire 56 with the exciter coil 40 can be avoided. In addition, even if the crossover wire 56 is brought into a tensioned state, the contact of the crossover wire 56 with the exciter coil 40 can be avoided. Thus, it is possible to automate the operation of winding the pair of DC coils 38, 38 around the cylindrical portions $35b_2$, $35b_2$.

Moreover, the collar 58 is formed without any variability upon molding of the bobbin $35_2$, and it is unnecessary for an operator to wind an insulating tape for the purpose of ensuring an insulating property. Therefore, the exciter coil 40 and the crossover wire 56 can be insulated from each other to ensure a stable insulating property, while avoiding an increase in operating steps.

Although the embodiments of the present invention have been described in detail, it will be understood that the present invention is not limited to the above-described embodiments, and various modifications in design may be made without departing from the spirit and scope of the invention defined in claims.

For example, the stator may be constructed by combination of the first and second embodiments with each other.

What is claimed is:

1. A stator for an outer rotor multi-pole generator, comprising a stator core including a plurality of salient poles projectingly mounted at equal distances from one another on an outer periphery of a core base formed into a ring shape, and a bobbin made of a synthetic resin, wherein said bobbin is integrally provided with a main bobbin portion covering at least the outer periphery of said core base, a plurality of cylindrical portions protruding from said main bobbin portion so as to cover said salient poles excluding tip ends of the salient poles, and a guide projection which protrudes in a cylindrical shape from one end surface of said main bobbin portion, said stator core and said bobbin being coupled by molding to each other, and a plurality of first coils identical to one another but different from a second coil wound around a particular one of said cylindrical portions, each one of a pair of the first coils is wound around a respective one of a pair of the cylindrical portions adjoining and located on opposite sides of said particular one of the cylindrical portions, a crossover wire connecting said pair of identical first coils being disposed along a portion of an outer periphery of said guide projection, and wherein said guide projection is partially depressed radially inwardly to define a recess between the outer periphery of the guide projection and radially inner ends of said first and second coils, said crossover wire being disposed in said recess.

2. A stator for an outer rotor multi-pole generator according to claim 1, wherein said first coils are DC coils and said second coil is an exciter coil.

3. A stator for an outer rotor multi-pole generator, comprising a stator core including a plurality of salient poles projectingly mounted at equal distances from one another on an outer periphery of a core base formed into a ring shape, and a bobbin made of a synthetic resin, wherein said bobbin is integrally provided with a main bobbin portion covering at least the outer periphery of said core base, a plurality of cylindrical portions protruding from said main bobbin portion so as to cover said salient poles excluding their tip ends, and a guide projection which protrudes in a cylindrical shape from one end surface of said main bobbin portion, said stator core and said bobbin being coupled by molding to each other, and a plurality of first coils identical to one another but different from a second coil wound around particular one of said cylindrical portions, each one of a pair of the first coils being wound around a respective one of a pair of the cylindrical portions adjoining and located on opposite sides of said particular one of the cylindrical portions, respectively, a crossover wire connecting said pair of identical first coils being disposed along a portion of an outer periphery of said guide projection, and wherein said particular one of said cylindrical portions integrally included in said bobbin is integrally provided at a base end thereof with a collar which protrudes radially outwardly from and extends about an outer periphery of the second coil wound around said particular one of the cylindrical portions, said collar being positioned radially outwardly of radially inner ends of said first coils, said crossover wire being disposed between said collar and said guide projection.

4. A stator for an outer rotor multi-pole generator according to claim 3, wherein said collar has a pair of grooves provided therein, and lead wires, which extend from opposite ends of the second coil wound around said particular cylindrical portion and which are connected to an external lead wire terminal and an earth terminal, are inserted through said grooves.

5. A stator for an outer rotor multi-pole generator according to claim 3, wherein said first coils are DC coils and said second coil is an exciter coil.

* * * * *